United States Patent [19]
Brandon

[11] Patent Number: 5,903,632
[45] Date of Patent: May 11, 1999

[54] AUTOMATED TELEPHONE DIRECTORY

[75] Inventor: Donald Brandon, Sherwood Park, Canada

[73] Assignee: TMAX Technologies Inc., Sherwood Park, Canada

[21] Appl. No.: 08/820,830

[22] Filed: Mar. 19, 1997

[51] Int. Cl.⁶ .................................................. H04M 11/00
[52] U.S. Cl. ....................... 379/93.23; 379/140; 379/142; 379/355
[58] Field of Search ............................... 379/90.01, 91.01, 379/93.05–93.07, 93.17–93.19, 93.21, 93.23, 110.01, 142, 201, 396, 354–357, 111–113, 120, 133, 140

[56] References Cited

U.S. PATENT DOCUMENTS

| | | | |
|---|---|---|---|
| 4,052,570 | 10/1977 | Sutton | 379/357 |
| 4,608,457 | 8/1986 | Fowler et al. | 379/52 |
| 4,757,302 | 7/1988 | Hatakeyama et al. | |
| 4,924,496 | 5/1990 | Figa et al. | 379/142 |
| 5,054,052 | 10/1991 | Nonami | 379/142 |
| 5,210,789 | 5/1993 | Jeffus et al. | 379/91.01 |
| 5,436,639 | 7/1995 | Arai et al. | |
| 5,541,988 | 7/1996 | Draganoff | 379/354 |
| 5,581,593 | 12/1996 | Engelke et al. | 379/355 |

FOREIGN PATENT DOCUMENTS 2097347  1/1995  Canada ................................. 379/357

*Primary Examiner*—Wing F. Chan
*Attorney, Agent, or Firm*—George A. Seaby

[57] ABSTRACT

The automated telephone directory of the present invention combines a telephone, a telephone directory and a telephone log into a single computerized unit. The primary directory database contains the directory information for an entire geographical region (i.e. city, state, province or country) and is accessed by a central processing unit to facilitate the placing of telephone calls and to create incoming and outgoing logs. Several other databases are created automatically or can be created manually to enhance the telephoning process. The system also includes the means to send and receive alphanumeric page messages. A display screen is provided to display, upon command of the CPU, the directory information of incoming and outgoing telephone calls and for displaying the various databases provided.

11 Claims, 7 Drawing Sheets

AUTOMATED TELEPHONE DIRECTORY

BACKGROUND OF THE INVENTION

FIELD OF THE INVENTION

The present invention relates to an automated telephone directory and in particular to a computerized telephone directory system for identifying and displaying directory information related to incoming and outgoing telephone calls.

DISCUSSION OF THE PRIOR ART

Prior art telephone directory systems consist of either a telephone with a small amount of memory for storage of a limited quantity of often used telephone numbers, (U.S. Pat. No. 4,924,496—Figa, Romek et al) or a personal computer hooked into a telephone line that requires special software to access telephone directory databases, (U.S. Pat. No. 5,457,738—Sylvan, Loren).

The former systems are unsatisfactory because they require the manual entry of data into a main database. Even when a new telephone number, decoded during an incoming telephone call, is saved in the log, the remaining directory information (name and address) must be researched and manually entered into the main database. Moreover, such systems are completely ineffective if the caller is not known by the owner. The latter type of system necessitates a relatively large capital cost and only functions when the personal computers are turned on. Moreover, these systems are relatively slow due to their layered software, which requires operating systems and specialized software. This approach provides flexibility at the cost of speed and efficiency. None of the prior art systems provide the combination of an incoming and an outgoing call log.

GENERAL DESCRIPTION OF THE INVENTION

An object of the present invention is to overcome the shortcomings of the prior art by providing an automated telephone directory system that requires no manual data entry and can identify callers even if they are strangers to the owner of the system. Another object of the present invention to provide an automated telephone directory system constructed specifically for the purpose of facilitating the management of directory information for incoming and outgoing calls into a series of individual and combined databases, which are automatically appended by a central processing unit, using a faster and more cost efficient system architecture.

Accordingly the present invention relates to an automated telephone directory for use in combination with a telephone and an incoming call number identification signal decoder for logging incoming telephone calls including first database means containing the telephone directory information for a given geographical region sorted into a plurality of records, each record including a name field and a telephone number field; second database means for storing the telephone directory information of the source of incoming telephone calls; first processing means for searching said first database means for the record containing a telephone number of the source of an incoming telephone call and for copying the record from said first database means into said second database means; display means for displaying the telephone directory information of the source of an incoming telephone call or for displaying a plurality of records from one of said database means, said plurality of records defining a page; and selector means for selecting which of said database means to display on said display means, whereby when an incoming telephone call is received by the telephone, the call number identification signal decoder provides the telephone number of the source of the incoming call to said first processing means, which searches said first database means for a record containing the telephone number and, if found, stores the record in said second database means and displays the record on said display means.

BRIEF DESCRIPTION OF THE DRAWINGS

The invention will be described in greater detail with reference to the accompanying drawings which illustrate a preferred embodiment of the present invention wherein.

DESCRIPTION OF THE PREFERRED EMBODIMENT

Figure 1:
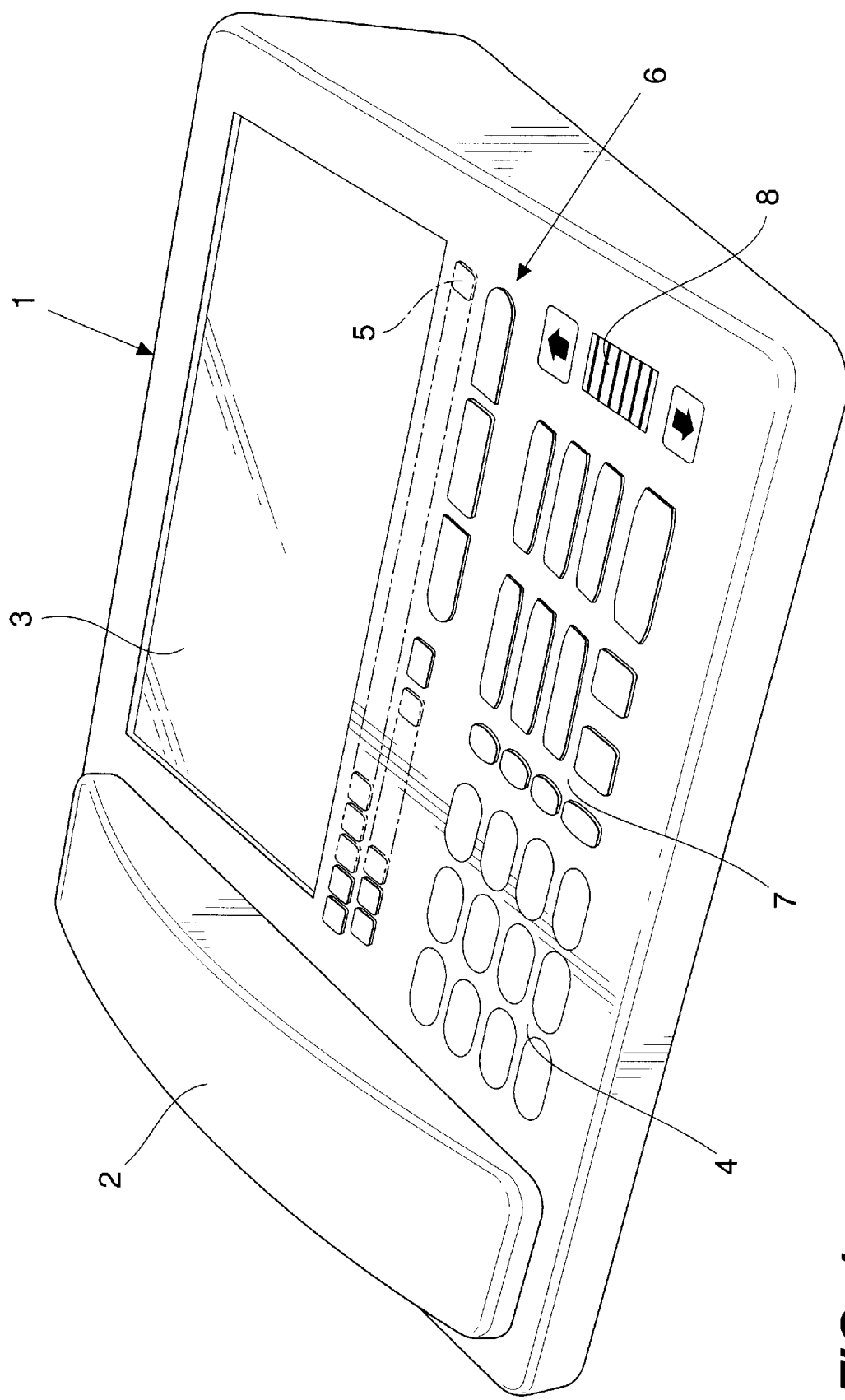
FIG. 1 is a perspective view of the automated telephone directory of the present invention.

With reference to FIG. 1, the automated telephone directory system is enclosed in a housing, generally indicated at 1, and includes a telephone handset 2, a display screen 3, numeric input key pad 4, text input key pad 5, database selector key pad 6, function key pad 7 and a page browser 8.

Although the automated telephone directory of the present invention could possibly be used with an existing telephone, in order for the system to reach its fullest potential, the two should be fully integrated.

Figure 2:
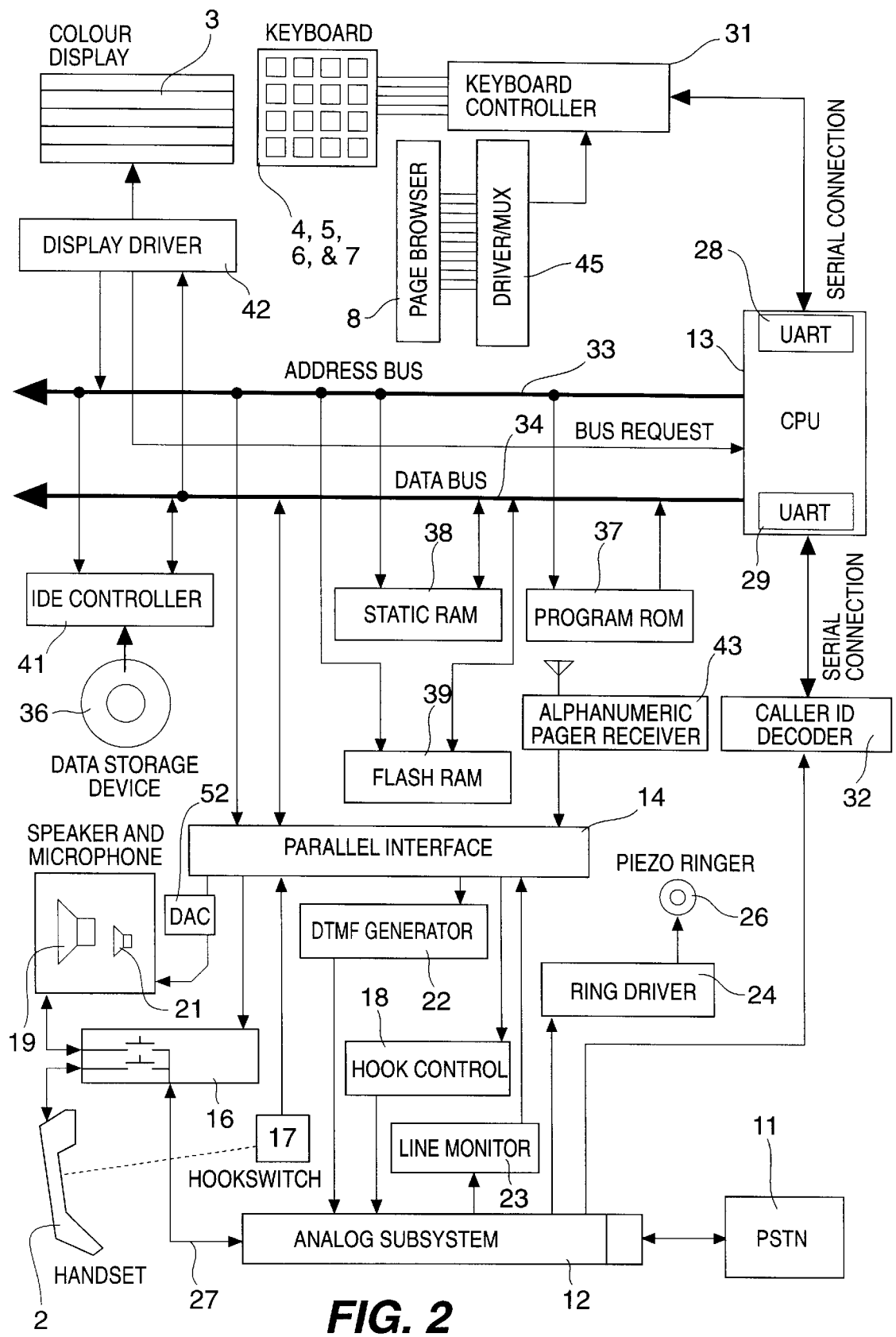
FIG. 2 is a schematic diagram of the directory of FIG. 1.

Illustrated schematically in FIG. 2, the automated telephone directory system of the present invention is connected to the public telephone network 11 using the standard two conductor wire (not shown) and analog hardware 12. However, some of the features which would normally directly interact with the Public Telephone Network 11 are under the control of a central processing unit (CPU) 13. A parallel interface 14 is used to allow the CPU 13 to monitor the status of the analog hardware 12 and to control several analog subsystems. For example, when the handset 2 is lifted from a control cradle 16, a hookswitch 17 signals the CPU 13 via the parallel interface 14. The CPU 13 responds with a command via the parallel interface 14 to a hook control 18 to take the telephone off-hook. Similarly, if a speaker phone function key on the function key pad 7 is depressed, the CPU 13, via the parallel interface 14, signals the hook control 18 to take the phone off-hook and sends a command to the control cradle 16 to route the audio through a remote speaker 19 and a remote microphone 21.

Another feature controlled by the CPU 13 is a dual tone multi-frequency (DTMF) generator 22, i.e. when the numeric keys 4 are depressed, the CPU 13 signals the DTMF generator 22 to send the appropriate signals. A line monitor 23 informs the CPU 13 that the telephone line is in use by another extension and whether the call originated as an incoming or an outgoing call, for reasons that will be discussed in greater detail below.

Analog features not controlled by the CPU 13 include a ringer driver 24 for activating a standard ringer 26 and audio transmissions, indicated by arrow 27, between the handset 2 (or speaker 19 and microphone 21) and the public telephone network 11.

The CPU 13 is called upon to do a variety of search and display activities, and in order for it to be responsive it has been constructed with a sixteen bit wide datapath running at a minimum of sixteen megahertz. The CPU 13 has two on-board universal asynchronous receiver/transmitters (UART's) 28 and 29 for serial data exchange. A keyboard controller 31, which is a small microprocessor which scans all of the push button key pads 4, 5, 6 and 7 and interprets the output of the page browser 8, is connected to the first UART 28. A caller number identification signal decoder 32, which is standard off-the-shelf hardware, interprets the signals sent with any incoming call by the telephone company to subscribers and provides the decoded information in a serial format to the CPU 13 via the second UART 29.

An address bus 33 and a data bus 34, with a sixteen bit wide datapath (the same as the CPU 13), are the predominant mechanisms used to move data between the various memory mapped subsystems and the CPU 13 and is normally controlled thereby.

The memory mapped subsystems include a mass data storage device 36, program ROM 37, static RAM 38 and flash RAM 39. The mass storage device 36, shown here as a standard IDE CD ROM with an IDE controller 41, could be any data storage medium capable of storing large amounts of data. The CD ROM was chosen because of cost effectiveness and universality. Ideally, the device 36 would hold the directory information, public (white pages) and business (yellow pages), for an entire region, province, state or country sorted alphabetically by name and by business type and numerically by telephone number. Every record in the device 36 includes a plurality of fields including a name field (personal or business), an address field (street, province or state, postal or zip code), a telephone number field and a business type field, where applicable.

The program ROM 37 stores the program code used by the CPU 13 to perform all of the functions of the automated telephone directory of the present invention. To increase efficiency the object code is burned into ROM chips for use by the CPU 13.

The static RAM 38, which is volatile memory and is erased when the power is shut off, has two uses. First, it is used to store variables and arrays used by the program, thereby enabling functions such as database searches to be performed. Second, it is used to store the contents of the color display 3. A display driver 42 uses buses 33 and 34 to pick up information, written by the CPU 13 into the static RAM 38, and displays it on the color display screen 3. The display driver 42 is a custom integrated circuit that continually refreshes the color display 3 and periodically makes a request of the CPU 13 to take control of the buses 33 and 34 to make a direct memory access of the static RAM 38 for displaying the information found therein.

The flash RAM 39 is non-volatile memory (i.e. is not erased if the power is shut off) and is used to store a variety of databases including the directory information for incoming and outgoing calls, a personal directory, pager numbers and pager messages. These databases are explained in greater detail below.

Another feature of the present invention is a pager receiver 43 for receiving alphanumeric page messages. Upon receipt, a message is stored in a small buffer incorporated in the page receiver 43. The parallel interface 14 then notifies the CPU 13 that a valid message has been received and is ready to be read.

The page browser 8 is a unique input device for searching a database by jumping forward or backward by any number of pages. A page being defined as the number of records from a database that are displayed on the display screen 3 at one time. For our purposes a page will be five records.

Figure 3:
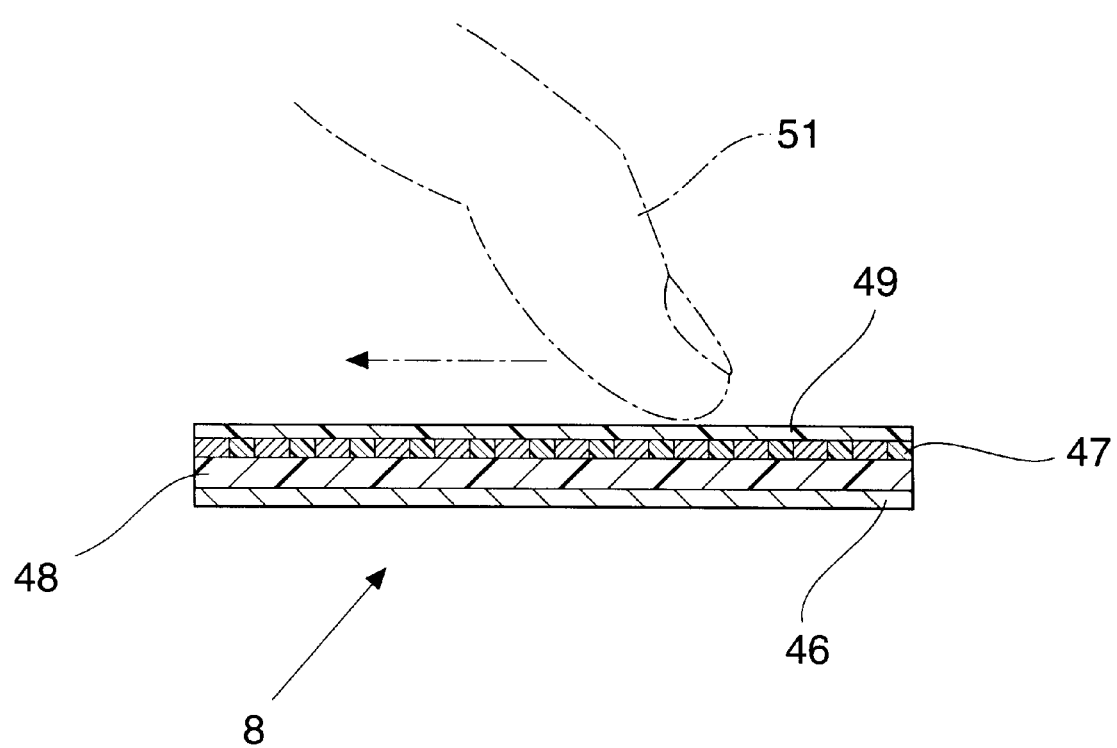
FIG. 3 is a cross-sectional view of the page browser of the directory of FIG. 1.

With reference to FIG. 3, the page browser 8 is designed to take advantage of the human finger's electromagnetic damping characteristics. The page browser 8 has a laminated structure including a bottom conductive (copper) layer 46, which has a high frequency signal injected therein by a browser driver/multiplexer 45 (FIG. 2). A layer of thin, parallel, copper strips 47 is separated from the bottom layer 46 by a thin layer of fiberglass material 48, known under the trademark FR-4. The strips 47 are coupled to the layer 46 using a capacitive coupling for picking up the high frequency signal. An upper protective layer 49 prevents any foreign matter from entering the page browser 8. When a human finger 51 passes over the device in a direction perpendicular to the copper strips 47, they are subject to a reduced level of signal, which is sensed by the browser driver/multiplexer 45. Each strip 47 is connected to a sensor circuit in the driver/multiplexer 45 which is scanned, in turn, by the keyboard controller 31 for any signal fluctuation. With this arrangement, the keyboard controller 31 can sense which direction (up or down) the human finger 51 passes over the page browser 8 which is translated by the CPU 13 to indicate whether the operator wishes to search forward or backward in the displayed database. To jump more than a single page, the operator simply uses the numeric key pad 4 to enter the number of pages to be jumped. Each time the page browser 8 is actuated, the CPU 13 sends an audio sound simulator signal via the parallel interface 14 to a digital to analog converter (DAC) 52, which activates the speakers 19 to broadcast the sound of a page being turned. The DAC 52 also converts analog signals to digital signals when the speaker phone 19 is in use.

FIGS. 4 to 7 illustrate the console of the directory and disclose the database selector key pad 6 including keys 60 ("PERSONAL"), 61 ("PEOPLE & PLACES") and 62 ("SHOPPERS GUIDE"), the function key pad 7 including function keys 70–83 and the different formats displayed on the display screen 3 to illustrate the plurality of databases.

Figure 4:
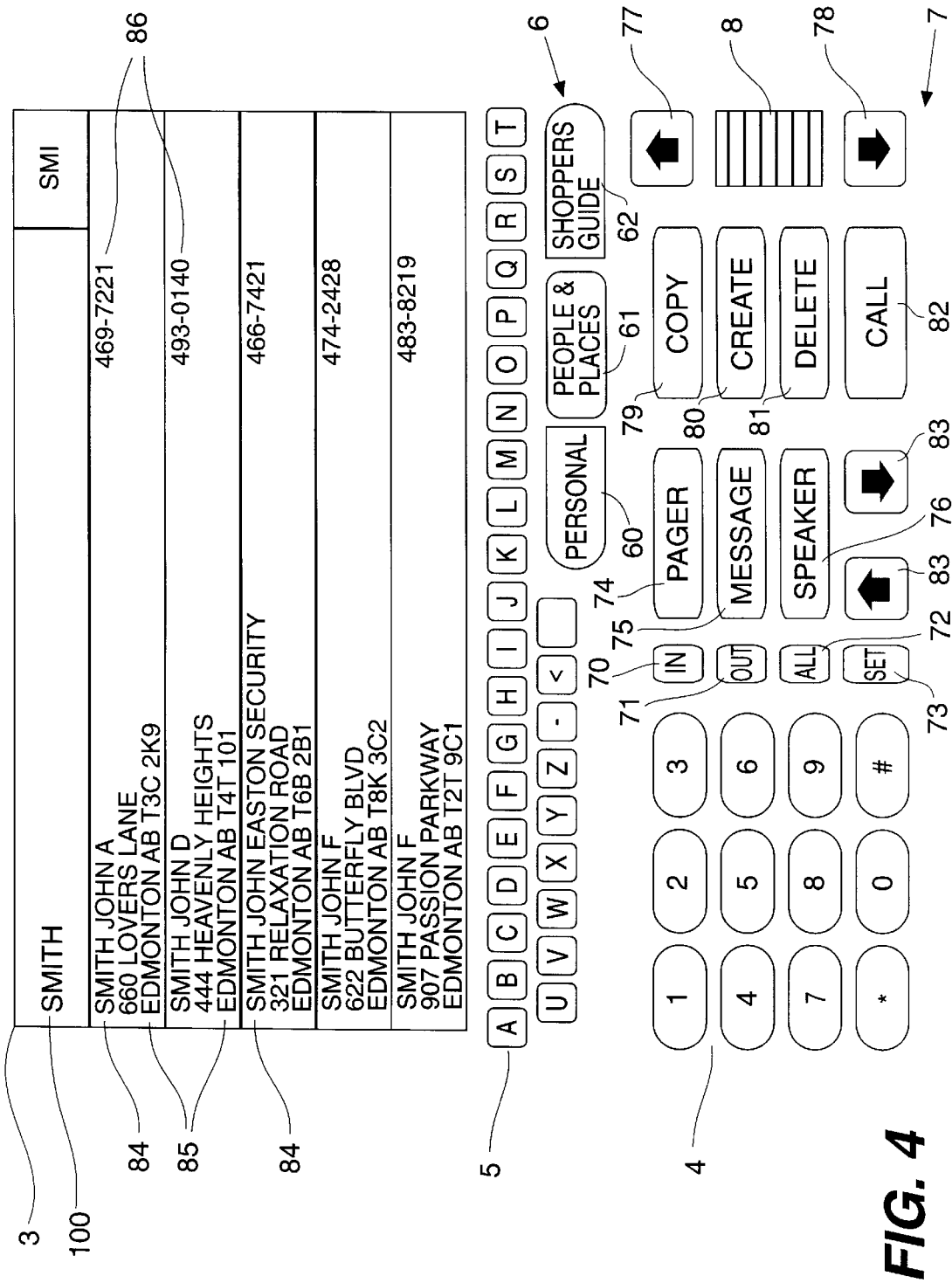
FIGS. 4 to 7 are plan views of the console of the directory of FIG. 1 and illustrate the various screens displayed thereby.
Figure 5:
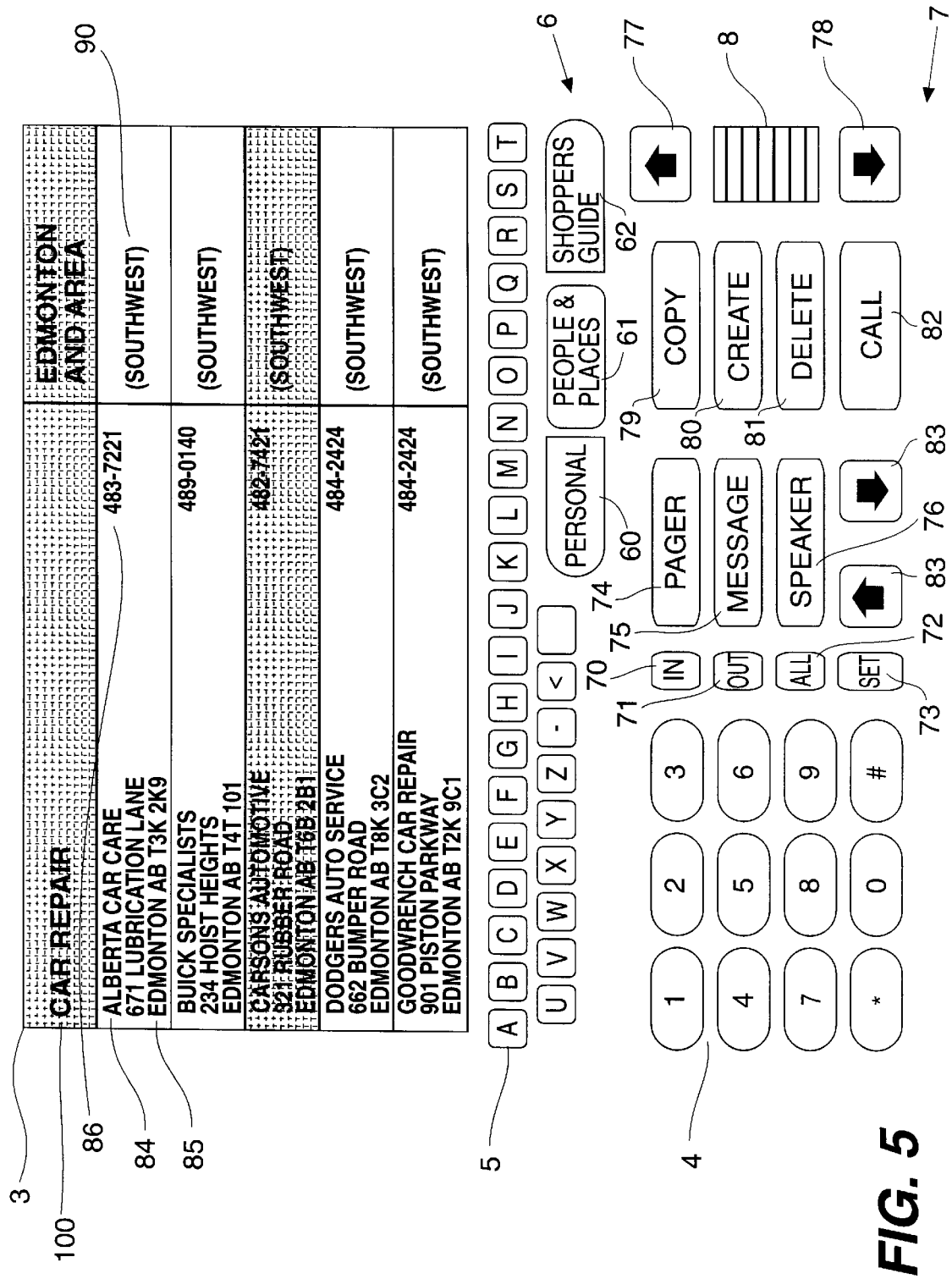

The primary or first database, which is stored on a mass storage device 36, is divided into two sections, namely a public directory or "PEOPLE & PLACES" and a business directory or "SHOPPERS GUIDE". A sample display of the public directory is shown in FIG. 4 and includes a name field 84, an address field 85, and a telephone number field 86. A sample display of the business directory is found in FIG. 5 and includes the name field 84, the address field 85, the telephone number field 86, a quadrant field 90, and a business type field 100. The quadrant field 90 indicates which section of the city (or metropolitan area) the business is located. The business type field 100 defines what category of business (e.g. automobile repair, lawyers) the company falls into.

To browse the first database the operator initially pushes the public ("PEOPLE & PLACES") key 61 or the business ("SHOPPERS GUIDE") key 62 thereby displaying the first page of the selected database. The operator may then flip through the pages of database by using the page browser 8 or define a search using the text input key pad 6. When the first three (or more) letters of the name (for the public directory) or of the business type (for the business directory) are typed, the CPU 13 initiates a search of the database and display the first page of records with that criteria. Initially, the business directory has the same format on the screen 3 as the public directory (FIG. 4) but a special feature of the business directory enables the operator to display the quadrant field 90 of all the displayed records by pushing the "SHOPPERS GUIDE" key 62, again. Moreover, after a specific record is selected using a pointer up key 77 and/or a pointer down key 78, all the records from the same quadrant are displayed by pushing the "SHOPPERS GUIDE" key 62, once again (See FIG. 5).

The remaining databases are stored on the flash RAM device 39 and include an incoming call log (second database), a personal directory (third database), an outgoing call log (fourth database), a pager number directory (fifth database), a pager text message directory (sixth database) and an all call directory (seventh database).

The third database is a personal directory created by the owner of the device using records copied from the first or second database or by manually entering the information using key pads 4 and 5. This directory has the same format on the display screen as the first directory (see FIG. 4). For manual entry, the "PERSONAL" directory key 60 is pushed, followed by the "CREATE" function key 80 and then the necessary information is input using the key pads 5 and 6. To copy a record from the first database, the "PEOPLE & PLACES" directory key 61 or the "SHOPPERS GUIDE" key 62 is depressed to select which database is to be accessed (FIG. 4). Then, the key pad 5 can be used to spell out the beginning of the name of the person, company or business type to be called which signals the CPU 13 to display the first page of records with that criteria. (Note: the more letters entered, the closer to the appropriate record.) Alternatively, the page browser 8 can be used to find the appropriate page. Finally, the pointer up key 77 or the pointer down key 78 are used to highlight the exact record to be copied and a "COPY" function key 79 is depressed thereby copying the highlighted record into the third database. A record from the second database can be copied directly into the third database using the "COPY" key 79.

Figure 6:
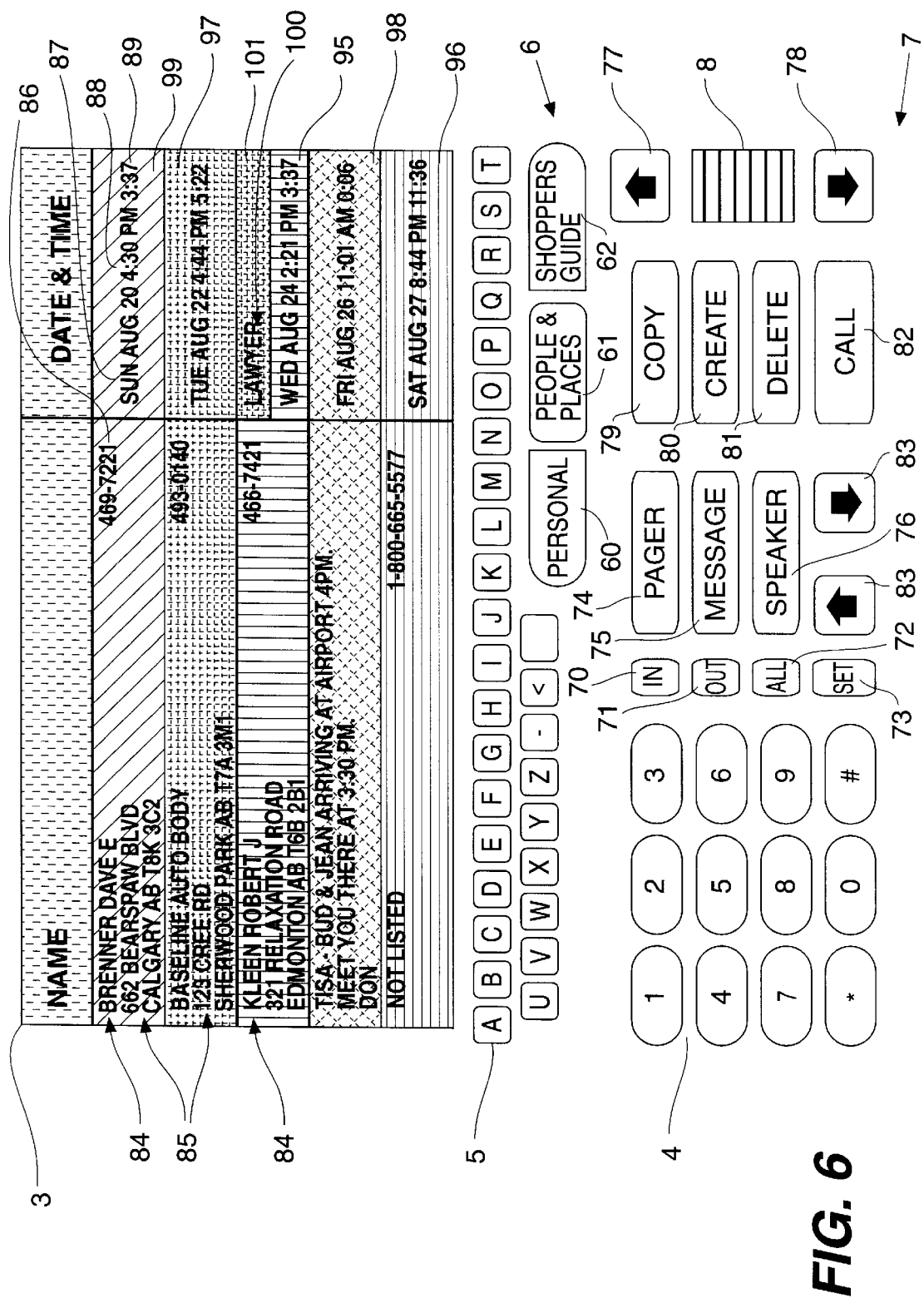
Figure 7:
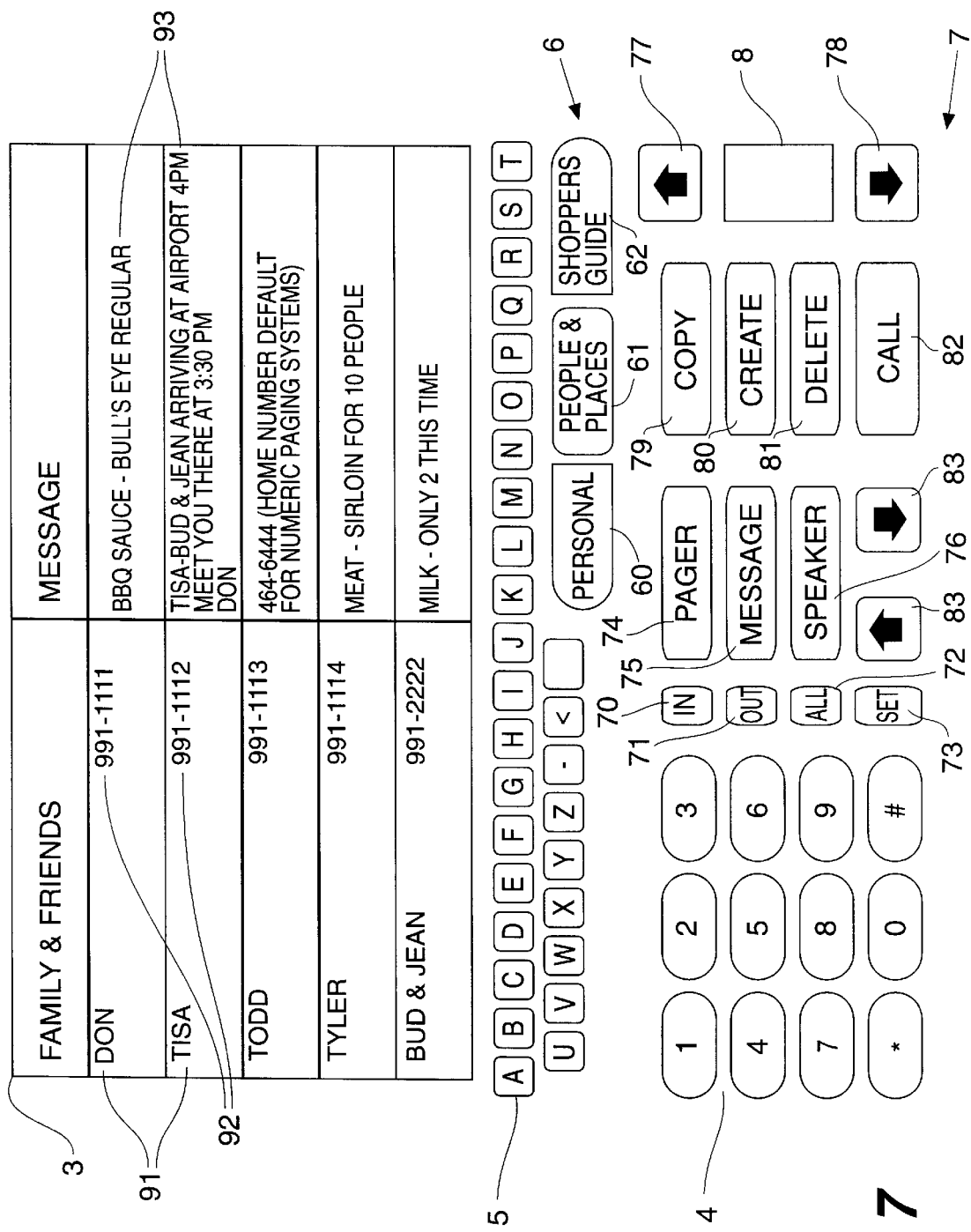

The second database stores the directory information of the source of incoming calls, and the date, time and, if completed, the duration of the incoming calls. When an incoming call is received, the caller identification decoder 32 interprets the caller ID signal, which is provided by the telephone company to subscribers, and provides the telephone number of the source of the incoming call to the CPU 13. The CPU 13 then initiates a search of the telephone number field in the first and third databases for an equivalent telephone number. If an equivalent telephone number is found, the CPU 13 displays the entire record (name, address, telephone number, business type etc.) on the display 3 and copies the record into the second database. The CPU 13, by accessing an internal clock, then adds the date, the start time and, when completed, the duration of the call to the newly created record in the second database. If the call is not completed the duration field is left blank. An "IN" function key 70 is depressed to display the second database. As seen in FIG. 6, the second database includes a name field 84, an address field 85, a telephone number field 86, a date field 87, a start time field 88, and a call duration field 89.

Placing a telephone call using the automated telephone directory of the present invention can be initiated by one of two ways. The first includes lifting the handset 2 and manually dialing the number using the numeric key pad 4. This process signals the CPU 13 (via the hookswitch 17) that a call is being placed and that the appropriate DTMF signals are to be sent using the DTMF generator 22. Moreover, the process initiates a search by the CPU 13 in the first and third databases for a record including the dialed telephone number. If a corresponding record is found, the CPU 13 displays the record on the screen 3 to give a visual indication that the correct number was dialed. The second way includes selecting one of the databases using the directory selector key pad 6, selecting the appropriate page using the page browser 8 or the key pad 5 to spell out the beginning of the name, selecting the appropriate record using the pointer up or pointer down keys 77 or 78, respectively, and depressing the "CALL" function key 82. This process initiates the same call initiating actions to be done by the CPU 13 as above. If the connection cannot be made because the other end is busy, the CPU 13 will automatically hang-up and redial the appropriate number until the call is connected or the caller hangs up using the handset 2 or the speaker key 76.

The fourth database is a log of outgoing telephone calls including the directory information (name, address, postal code and business type) of the destination of the call as well as the date, time and, if completed, duration of the call (same format when displayed as the second database, FIG. 6). If the call is not completed the duration field is left blank. If the call is placed manually, the CPU 13 appends the fourth database with the record found during the search of the first and third databases along with the date, time and duration calculated using the internal clock. If the call is placed using the directory key pad 6 and the function key pad 7, the CPU 13 appends the fourth database with the selected record along with the date, time and duration of the call. The fourth database is displayed by pushing the "OUT" key 71.

The fifth database includes a list of names along with their corresponding pager numbers. A sample page from the fifth database is shown in the left column of FIG. 7 and includes a name field 91 and a pager number field 92. The sixth database includes a plurality of preset, often used alphanumeric page messages. A sample page from the sixth database is shown in the right column of FIG. 7 and includes a message field 93. The "PAGER" function key 74 is depressed to display the fifth database on the display 3 (FIG. 7) and the specific number is selected using any of the selection processes described above. If the message to be sent is numeric, the "CALL" function key 82 is depressed and the number is entered using the keys 4. Alternatively, numeric messages can be sent using the fifth database. The process includes pressing the "PAGER" key 74, selecting the appropriate record using the selection processes described above, and pressing the "CALL" key 82. This process automatically transmits the caller's telephone number as well as the signal generated from the # key, which activates an optional feedback message from the pager server. Text messages can be sent by one of two ways. The first way includes pressing the "MESSAGE" function key 75, pressing the "CREATE" function key 80, typing the message using the key pad 5 and pressing the "CALL" function key 82. The second way includes pressing the "MESSAGE" function key 75 which displays the sixth database beside (split screen) the fifth database. Then, using the variety of selection methods described above, a preset message is selected from the sixth database and aligned with the pager number from the fifth database. The message is sent by pressing the "CALL" function key 82. The CPU 13 is programmed to convert the text messages into DTMF (dual tone multi-frequency) signals, according to any given code, and using the DTMF generator 22 to transmit the signals over a normal telephone line to a remote page provider station for reconversion and decoding.

To ensure that a message has been processed and transmitted, by the paging company the CPU 13 is programmed with a page check system which sends a copy of all outgoing page messages to the caller's own pager receiver 43.

The seventh database is a combination of the second and fourth databases (incoming and outgoing calls) which can be displayed using the "ALL" function key 72. This database chronologically stores a record of all telephone and pager traffic to be displayed at one time (FIG. 6).

A "SPEAKER" key 76 activates the speaker phone 19 and volume control keys 83 adjust the volume up or down.

Pressing the "SET" key 73 displays a menu on the display screen 3 that enables several of the systems settings to be adjusted. These settings include the date, the ringer volume and the light intensity of the screen 3.

Another feature of the directory system is call and database indicator system programming which instructs the CPU 13 to change the background color of the display screen 3 according to the type of call or database displayed. Ideally, the "PEOPLE & PLACES" section of the first database would have a white background, the "SHOPPERS GUIDE" section of the first database would have a yellow background, the third database ("PERSONAL") would have a green background, the second database (incoming) would have a pink background, and the fifth and sixth databases would have an orange background. With reference to FIG. 6, the background colors of the fourth and seventh databases are indicative of the type of call (incoming or outgoing) and indicate the database from which database the outgoing calls were initiated. In general, records of incoming calls have a pink background 95, records of outgoing calls placed manually have a blue background 96 and records of other outgoing calls have a background indicative of the database from which the call was placed. For example, a call placed using the "PEOPLE & PLACES" database has a record with a white background and if the "SHOPPERS GUIDE" is used the background 97 is yellow. Records of pager calls have an orange background 98 and records of calls that use the third or "PERSONAL" database have a green background 99. The business field 100 has a yellow background 101.

For added convenience, when an incoming call is being received, the CPU 13 signals the display driver 42 to turn the display screen 3 pink to give a visual indication to anyone proximate to or remote from the screen 3 that a call is being received. Moreover, if an outgoing call, placed on an extension, is in progress, the line monitor 23 signals the CPU 13, which instructs the display driver 42 to turn the display screen blue. This gives a visual indication that the line is in use.

I claim:

1. An automated telephone directory for use in combination with a telephone and an incoming call number identification signal decoder including first database means containing the telephone directory information for a given geographical region sorted into a plurality of records, each record including a name field and a telephone number field; second database means for storing the telephone directory information of the source of incoming telephone calls sorted into records each record including name, telephone number, date, start time and duration fields; outgoing calls have distinct color patterns indicative of the said database means from which the telephone calls were placed.

2. An automated telephone directory system according to claim 1 including page check means for sending a copy of each of the page messages sent by said paging means to said page receiver means.

3. An automated telephone directory system according to claim 1 including call indicator means for producing a distinct color pattern on the background of said display means when an incoming call is received and when an outgoing call is placed for indicating whether the phone is in use and whether the call is an incoming or outgoing call.

4. An automated telephone directory system according to claim 1, wherein said second input means includes page browsing means for selecting a page from one of said database means to be displayed on said display means; and pointer means for indicating on said display means a specific record from the selected page.

5. An automated telephone directory system according to claim 1, wherein said page browsing means changes the page displayed on said display means from a first page from one of said database means to a second page of said same database means and including third input means for selecting the number of pages between the first page and the second page and fourth input means for selecting whether the second page is prior or subsequent to the first page and for initiating the change.

6. An automated telephone directory system according to claim 5, wherein, if said fourth input means is actuated without activating said third input means, said page browser means displays the next page or the previous page.

7. An automated telephone directory system according to claim 6 including sound simulator means for simulating the sound of a book page turning whenever said page browser means is actuated.

8. An automated telephone directory system according to claim 1, wherein said first database means includes the telephone directory information of a metropolitan area, the records stored alphabetically by name and by business type, and in numerical order by telephone number.

9. An automated telephone directory system according to claim 1 including call redial means for automatically redialling a selected telephone number whereby, if the selected telephone line is busy said call redial means will disconnect the call and redial the selected telephone number until the call is completed or the caller disengages said call redial means.

10. An automated telephone directory system according to claim 1 including text coding means for automatically converting text messages into representative dual tone multi-frequency signals for transmission to a decoder at a remote paging system.

11. An automated telephone directory system according to claim 1, wherein the records of said first, second, third and fourth database means include a business field for indicating a caller's type of business.

* * * * *

UNITED STATES PATENT AND TRADEMARK OFFICE
CERTIFICATE OF CORRECTION

PATENT NO. : 5,903,632
DATED : May 11, 1999
INVENTOR(S) : Brandon

It is certified that error appears in the above-identified patent and that said Letters Patent is hereby corrected as shown below:

The title page should be deleted to appear as per attached title page.

Please delete columns 1-8 and substitute columns 1-10 as per attached.

Signed and Sealed this

Twenty-sixth Day of October, 1999

Attest:

Q. TODD DICKINSON

*Attesting Officer*          *Acting Commissioner of Patents and Trademarks*

United States Patent [19]
Brandon

[11] Patent Number: 5,903,632
[45] Date of Patent: May 11, 1999

[54] AUTOMATED TELEPHONE DIRECTORY

[75] Inventor: Donald Brandon, Sherwood Park, Canada

[73] Assignee: TMAX Technologies Inc., Sherwood Park, Canada

[21] Appl. No.: 08/820,830

[22] Filed: Mar. 19, 1997

[51] Int. Cl.[6] .................................................. H04M 11/00
[52] U.S. Cl. .................... 379/93.23; 379/140; 379/142; 379/355
[58] Field of Search ..................... 379/90.01, 91.01, 379/93.05–93.07, 93.17–93.19, 93.21, 93.23, 110.01, 142, 201, 396, 354–357, 111–113, 120, 133, 140

[56] References Cited

U.S. PATENT DOCUMENTS

| | | | |
|---|---|---|---|
| 4,052,570 | 10/1977 | Sutton | 379/357 |
| 4,608,457 | 8/1986 | Fowler et al. | 379/52 |
| 4,757,302 | 7/1988 | Hatakeyama et al. | |
| 4,924,496 | 5/1990 | Figa et al. | 379/142 |
| 5,054,052 | 10/1991 | Nonami | 379/142 |
| 5,210,789 | 5/1993 | Jeffus et al. | 379/91.01 |
| 5,436,639 | 7/1995 | Arai et al. | |
| 5,541,988 | 7/1996 | Draganoff | 379/354 |
| 5,581,593 | 12/1996 | Engelke et al. | 379/355 |

FOREIGN PATENT DOCUMENTS 2097347  1/1995  Canada .................... 379/357

*Primary Examiner*—Wing F. Chan
*Attorney, Agent, or Firm*—George A. Seaby

[57] ABSTRACT

The automated telephone directory of the present invention combines a telephone, a telephone directory and a telephone log into a single computerized unit. The primary directory database contains the directory information for an entire geographical region (i.e. city, state, province or country) and is accessed by a central processing unit to facilitate the placing of telephone calls and to create incoming and outgoing logs. Several other databases are created automatically or can be created manually to enhance the telephoning process. The system also includes the means to send and receive alphanumeric page messages. A display screen is provided to display, upon command of the CPU, the directory information of incoming and outgoing telephone calls and for displaying the various databases provided.

11 Claims, 7 Drawing Sheets

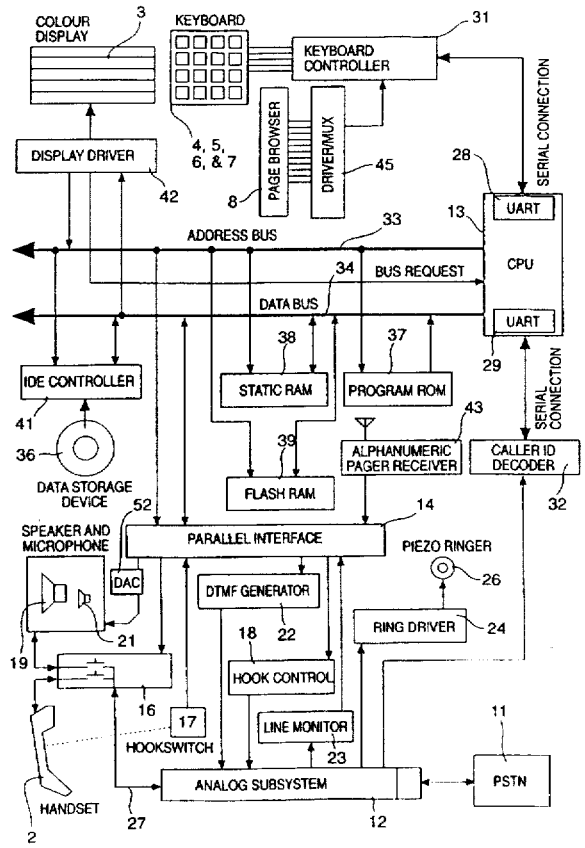

AUTOMATED TELEPHONE DIRECTORY

BACKGROUND OF THE INVENTION

FIELD OF THE INVENTION

The present invention relates to an automated telephone directory and in particular to a computerized telephone directory system for identifying and displaying directory information related to incoming and outgoing telephone calls.

DISCUSSION OF THE PRIOR ART

Prior art telephone directory systems consist of either a telephone with a small amount of memory for storage of a limited quantity of often used telephone numbers, (U.S. Pat. No. 4,924,496—Figa, Romek et al) or a personal computer hooked into a telephone line that requires special software to access telephone directory databases, (U.S. Pat. No. 5,457,738—Sylvan, Loren).

The former systems are unsatisfactory because they require the manual entry of data into a main database. Even when a new telephone number, decoded during an incoming telephone call, is saved in the log, the remaining directory information (name and address) must be researched and manually entered into the main database. Moreover, such systems are completely ineffective if the caller is not known by the owner. The latter type of system necessitates a relatively large capital cost and only functions when the personal computers are turned on. Moreover, these systems are relatively slow due to their layered software, which requires operating systems and specialized software. This approach provides flexibility at the cost of speed and efficiency. None of the prior art systems provide the combination of an incoming and an outgoing call log.

GENERAL DESCRIPTION OF THE INVENTION

An object of the present invention is to overcome the shortcomings of the prior art by providing an automated telephone directory system that requires no manual data entry and can identify callers even if they are strangers to the owner of the system. Another object of the present invention to provide an automated telephone directory system constructed specifically for the purpose of facilitating the management of directory information for incoming and outgoing calls into a series of individual and combined databases, which are automatically appended by a central processing unit, using a faster and more cost efficient system architecture.

Accordingly the present invention relates to an automated telephone directory for use in combination with a telephone and an incoming call number identification signal decoder for logging incoming telephone calls including first database means containing the telephone directory information for a given geographical region sorted into a plurality of records, each record including a name field and a telephone number field; second database means for storing the telephone directory information of the source of incoming telephone calls; first processing means for searching said first database means for the record containing a telephone number of the source of an incoming telephone call and for copying the record from said first database means into said second database means; display means for displaying the telephone directory information of the source of an incoming telephone call or for displaying a plurality of records from one of said database means, said plurality of records defining a page; and selector means for selecting which of said database means to display on said display means, whereby when an incoming telephone call is received by the telephone, the call number identification signal decoder provides the telephone number of the source of the incoming call to said first processing means, which searches said first database means for a record containing the telephone number and, if found, stores the record in said second database means and displays the record on said display means.

BRIEF DESCRIPTION OF THE DRAWINGS

The invention will be described in greater detail with reference to the accompanying drawings which illustrate a preferred embodiment of the present invention wherein:

FIG. 1 is a perspective view of the automated telephone directory of the present invention;

FIG. 2 is a schematic diagram of the directory of FIG. 1;

FIG. 3 is a cross-sectional view of the page browser of the directory of FIG. 1; and FIGS. 4 to 7 are plan views of the console of the directory of FIG. 1 and illustrate the various screens displayed thereby.

DESCRIPTION OF THE PREFERRED EMBODIMENT

With reference to FIG. 1, the automated telephone directory system is enclosed in a housing, generally indicated at 1, and includes a telephone handset 2, a display screen 3, numeric input key pad 4, text input key pad 5, database selector key pad 6, function key pad 7 and a page browser 8.

Although the automated telephone directory of the present invention could possibly be used with an existing telephone, in order for the system to reach its fullest potential, the two should be fully integrated.

Illustrated schematically in FIG. 2, the automated telephone directory system of the present invention is connected to the public telephone network 11 using the standard two conductor wire (not shown) and analog hardware 12. However, some of the features which would normally directly interact with the Public Telephone Network 11 are under the control of a central processing unit (CPU) 13. A parallel interface 14 is used to allow the CPU 13 to monitor the status of the analog hardware 12 and to control several analog subsystems. For example, when the handset 2 is lifted from a control cradle 16, a hookswitch 17 signals the CPU 13 via the parallel interface 14. The CPU 13 responds with a command via the parallel interface 14 to a hook control 18 to take the telephone off-hook. Similarly, if a speaker phone function key on the function key pad 7 is depressed, the CPU 13, via the parallel interface 14, signals the hook control 18 to take the phone off-hook and sends a command to the control cradle 16 to route the audio through a remote speaker 19 and a remote microphone 21.

Another feature controlled by the CPU 13 is a dual tone multi-frequency (DTMF) generator 22, i.e. when the numeric keys 4 are depressed, the CPU 13 signals the DTMF generator 22 to send the appropriate signals. A line monitor 23 informs the CPU 13 that the telephone line is in use by another extension and whether the call originated as an incoming or an outgoing call, for reasons that will be discussed in greater detail below.

Analog features not controlled by the CPU 13 include a ringer driver 24 for activating a standard ringer 26 and audio transmissions, indicated by arrow 27, between the handset 2 (or speaker 19 and microphone 21) and the public telephone network 11.

The CPU 13 is called upon to do a variety of search and display activities, and in order for it to be responsive it has been constructed with a sixteen bit wide datapath running at a minimum of sixteen megahertz. The CPU 13 has two on-board universal asynchronous receiver/transmitters (UART's) 28 and 29 for serial data exchange. A keyboard controller 31, which is a small microprocessor which scans all of the push button key pads 4, 5, 6 and 7 and interprets the output of the page browser 8, is connected to the first UART 28. A caller number identification signal decoder 32, which is standard off-the-shelf hardware, interprets the signals sent with any incoming call by the telephone company to subscribers and provides the decoded information in a serial format to the CPU 13 via the second UART 29.

An address bus 33 and a data bus 34, with a sixteen bit wide datapath (the same as the CPU 13), are the predominant mechanisms used to move data between the various memory mapped subsystems and the CPU 13 and is normally controlled thereby.

The memory mapped subsystems include a mass data storage device 36, program ROM 37, static RAM 38 and flash RAM 39. The mass storage device 36, shown here as a standard IDE CD ROM with an IDE controller 41, could be any data storage medium capable of storing large amounts of data. The CD ROM was chosen because of cost effectiveness and universality. Ideally, the device 36 would hold the directory information, public (white pages) and business (yellow pages), for an entire region, province, state or country sorted alphabetically by name and by business type and numerically by telephone number. Every record in the device 36 includes a plurality of fields including a name field (personal or business), an address field (street, province or state, postal or zip code), a telephone number field and a business type field, where applicable.

The program ROM 37 stores the program code used by the CPU 13 to perform all of the functions of the automated telephone directory of the present invention. To increase efficiency the object code is burned into ROM chips for use by the CPU 13.

The static RAM 38, which is volatile memory and is erased when the power is shut off, has two uses. First, it is used to store variables and arrays used by the program, thereby enabling functions such as database searches to be performed. Second, it is used to store the contents of the color display 3. A display driver 42 uses buses 33 and 34 to pick up information, written by the CPU 13 into the static RAM 38, and displays it on the color display screen 3. The display driver 42 is a custom integrated circuit that continually refreshes the color display 3 and periodically makes a request of the CPU 13 to take control of the buses 33 and 34 to make a direct memory access of the static RAM 38 for displaying the information found therein.

The flash RAM 39 is non-volatile memory (i.e. is not erased if the power is shut off) and is used to store a variety of databases including the directory information for incoming and outgoing calls, a personal directory, pager numbers and pager messages. These databases are explained in greater detail below.

Another feature of the present invention is a pager receiver 43 for receiving alphanumeric page messages. Upon receipt, a message is stored in a small buffer incorporated in the page receiver 43. The parallel interface 14 then notifies the CPU 13 that a valid message has been received and is ready to be read.

The page browser 8 is a unique input device for searching a database by jumping forward or backward by any number of pages. A page being defined as the number of records from a database that are displayed on the display screen 3 at one time. For our purposes a page will be five records.

With reference to FIG. 3, the page browser 8 is designed to take advantage of the human finger's electromagnetic damping characteristics. The page browser 8 has a laminated structure including a bottom conductive (copper) layer 46, which has a high frequency signal injected therein by a browser driver/multiplexer 45 (FIG. 2). A layer of thin, parallel, copper strips 47 is separated from the bottom layer 46 by a thin layer of fiberglass material 48, known under the trademark FR-4. The strips 47 are coupled to the layer 46 using a capacitive coupling for picking up the high frequency signal. An upper protective layer 49 prevents any foreign matter from entering the page browser 8. When a human finger 51 passes over the device in a direction perpendicular to the copper strips 47, they are subject to a reduced level of signal, which is sensed by the browser driver/multiplexer 45. Each strip 47 is connected to a sensor circuit in the driver/multiplexer 45 which is scanned, in turn, by the keyboard controller 31 for any signal fluctuation. With this arrangement, the keyboard controller 31 can sense which direction (up or down) the human finger 51 passes over the page browser 8 which is translated by the CPU 13 to indicate whether the operator wishes to search forward or backward in the displayed database. To jump more than a single page, the operator simply uses the numeric key pad 4 to enter the number of pages to be jumped. Each time the page browser 8 is actuated, the CPU 13 sends an audio sound simulator signal via the parallel interface 14 to a digital to analog converter (DAC) 52, which activates the speakers 19 to broadcast the sound of a page being turned. The DAC 52 also converts analog signals to digital signals when the speaker phone 19 is in use.

FIGS. 4 to 7 illustrate the console of the directory and disclose the database selector key pad 6 including keys 60 ("PERSONAL"), 61 ("PEOPLE & PLACES") and 62 ("SHOPPERS GUIDE"), the function key pad 7 including function keys 70–83 and the different formats displayed on the display screen 3 to illustrate the plurality of databases.

The primary or first database, which is stored on a mass storage device 36, is divided into two sections, namely a public directory or "PEOPLE & PLACES" and a business directory or "SHOPPERS GUIDE". A sample display of the public directory is shown in FIG. 4 and includes a name field 84, an address field 85, and a telephone number field 86. A sample display of the business directory is found in FIG. 5 and includes the name field 84, the address field 85, the telephone number field 86, a quadrant field 90, and a business type field 100. The quadrant field 90 indicates which section of the city (or metropolitan area) the business is located. The business type field 100 defines what category of business (e.g. automobile repair, lawyers) the company falls into.

To browse the first database the operator initially pushes the public ("PEOPLE & PLACES") key 61 or the business ("SHOPPERS GUIDE") key 62 thereby displaying the first page of the selected database. The operator may then flip through the pages of database by using the page browser 8 or define a search using the text input key pad 6. When the first three (or more) letters of the name (for the public directory) or of the business type (for the business directory) are typed, the CPU 13 initiates a search of the database and display the first page of records with that criteria. Initially, the business directory has the same format on the screen 3 as the public directory (FIG. 4) but a special feature of the business directory enables the operator to display the quadrant field 90 of all the displayed records by pushing the "SHOPPERS GUIDE" key 62, again. Moreover, after a specific record is selected using a pointer up key 77 and/or a pointer down key 78, all the records from the same quadrant are displayed by pushing the "SHOPPERS GUIDE" key 62, once again (See FIG. 5).

The remaining databases are stored on the flash RAM device 39 and include an incoming call log (second database), a personal directory (third database), an outgoing call log (fourth database), a pager number directory (fifth database), a pager text message directory (sixth database) and an all call directory (seventh database).

The third database is a personal directory created by the owner of the device using records copied from the first or second database or by manually entering the information using key pads 4 and 5. This directory has the same format on the display screen as the first directory (see FIG. 4). For manual entry, the "PERSONAL" directory key 60 is pushed, followed by the "CREATE" function key 80 and then the necessary information is input using the key pads 5 and 6. To copy a record from the first database, the "PEOPLE & PLACES" directory key 61 or the "SHOPPERS GUIDE" key 62 is depressed to select which database is to be accessed (FIG. 4). Then, the key pad 5 can be used to spell out the beginning of the name of the person, company or business type to be called which signals the CPU 13 to display the first page of records with that criteria. (Note: the more letters entered, the closer to the appropriate record.) Alternatively, the page browser 8 can be used to find the appropriate page. Finally, the pointer up key 77 or the pointer down key 78 are used to highlight the exact record to be copied and a "COPY" function key 79 is depressed thereby copying the highlighted record into the third database. A record from the second database can be copied directly into the third database using the "COPY" key 79.

The second database stores the directory information of the source of incoming calls, and the date, time and, if completed, the duration of the incoming calls. When an incoming call is received, the caller identification decoder 32 interprets the caller ID signal, which is provided by the telephone company to subscribers, and provides the telephone number of the source of the incoming call to the CPU 13. The CPU 13 then initiates a search of the telephone number field in the first and third databases for an equivalent telephone number. If an equivalent telephone number is found, the CPU 13 displays the entire record (name, address, telephone number, business type etc.) on the display 3 and copies the record into the second database. The CPU 13, by accessing an internal clock, then adds the date, the start time and, when completed, the duration of the call to the newly created record in the second database. If the call is not completed the duration field is left blank. An "IN" function key 70 is depressed to display the second database. As seen in FIG. 6, the second database includes a name field 84, an address field 85, a telephone number field 86, a date field 87, a start time field 88, and a call duration field 89.

Placing a telephone call using the automated telephone directory of the present invention can be initiated by one of two ways. The first includes lifting the handset 2 and manually dialing the number using the numeric key pad 4. This process signals the CPU 13 (via the hookswitch 17) that a call is being placed and that the appropriate DTMF signals are to be sent using the DTMF generator 22. Moreover, the process initiates a search by the CPU 13 in the first and third databases for a record including the dialed telephone number. If a corresponding record is found, the CPU 13 displays the record on the screen 3 to give a visual indication that the correct number was dialed. The second way includes selecting one of the databases using the directory selector key pad 6, selecting the appropriate page using the page browser 8 or the key pad 5 to spell out the beginning of the name, selecting the appropriate record using the pointer up or pointer down keys 77 or 78, respectively, and depressing the "CALL" function key 82. This process initiates the same call initiating actions to be done by the CPU 13 as above. If the connection cannot be made because the other end is busy, the CPU 13 will automatically hang-up and redial the appropriate number until the call is connected or the caller hangs up using the handset 2 or the speaker key 76.

The fourth database is a log of outgoing telephone calls including the directory information (name, address, postal code and business type) of the destination of the call as well as the date, time and, if completed, duration of the call (same format when displayed as the second database, FIG. 6). If the call is not completed the duration field is left blank. If the call is placed manually, the CPU 13 appends the fourth database with the record found during the search of the first and third databases along with the date, time and duration calculated using the internal clock. If the call is placed using the directory key pad 6 and the function key pad 7, the CPU 13 appends the fourth database with the selected record along with the date, time and duration of the call. The fourth database is displayed by pushing the "OUT" key 71.

The fifth database includes a list of names along with their corresponding pager numbers. A sample page from the fifth database is shown in the left column of FIG. 7 and includes a name field 91 and a pager number field 92. The sixth database includes a plurality of preset, often used alphanumeric page messages. A sample page from the sixth database is shown in the right column of FIG. 7 and includes a message field 93. The "PAGER" function key 74 is depressed to display the fifth database on the display 3 (FIG. 7) and the specific number is selected using any of the selection processes described above. If the message to be sent is numeric, the "CALL" function key 82 is depressed and the number is entered using the keys 4. Alternatively, numeric messages can be sent using the fifth database. The process includes pressing the "PAGER" key 74, selecting the appropriate record using the selection processes described above, and pressing the "CALL" key 82. This process automatically transmits the caller's telephone number as well as the signal generated from the # key, which activates an optional feedback message from the pager server. Text messages can be sent by one of two ways. The first way includes pressing the "MESSAGE" function key 75, pressing the "CREATE" function key 80, typing the message using the key pad 5 and pressing the "CALL" function key 82. The second way includes pressing the "MESSAGE" function key 75 which displays the sixth database beside (split screen) the fifth database. Then, using the variety of selection methods described above, a preset message is selected from the sixth database and aligned with the pager number from the fifth database. The message is sent by pressing the "CALL" function key 82. The CPU 13 is programmed to convert the text messages into DTMF (dual tone multi-frequency) signals, according to any given code, and using the DTMF generator 22 to transmit the signals over a normal telephone line to a remote page provider station for reconversion and decoding.

To ensure that a message has been processed and transmitted, by the paging company the CPU 13 is programmed with a page check system which sends a copy of all outgoing page messages to the caller's own pager receiver 43.

The seventh database is a combination of the second and fourth databases (incoming and outgoing calls) which can be displayed using the "ALL" function key 72. This database chronologically stores a record of all telephone and pager traffic to be displayed at one time (FIG. 6).

A "SPEAKER" key 76 activates the speaker phone 19 and volume control keys 83 adjust the volume up or down.

Pressing the "SET" key 73 displays a menu on the display screen 3 that enables several of the systems settings to be adjusted. These settings include the date, the ringer volume and the light intensity of the screen 3.

Another feature of the directory system is call and database indicator system programming which instructs the CPU 13 to change the background color of the display screen 3 according to the type of call or database displayed. Ideally, the "PEOPLE & PLACES" section of the first database would have a white background, the "SHOPPERS GUIDE" section of the first database would have a yellow background, the third database ("PERSONAL") would have a green background, the second database (incoming) would have a pink background, and the fifth and sixth databases would have an orange background. With reference to FIG. 6, the background colors of the fourth and seventh databases are indicative of the type of call (incoming or outgoing) and indicate the database from which database the outgoing calls were initiated. In general, records of incoming calls have a pink background 95, records of outgoing calls placed manually have a blue background 96 and records of other outgoing calls have a background indicative of the database from which the call was placed. For example, a call placed using the "PEOPLE & PLACES" database has a record with a white background and if the "SHOPPERS GUIDE" is used the background 97 is yellow. Records of pager calls have an orange background 98 and records of calls that use the third or "PERSONAL" database have a green background 99. The business field 100 has a yellow background 101.

For added convenience, when an incoming call is being received, the CPU 13 signals the display driver 42 to turn the display screen 3 pink to give a visual indication to anyone proximate to or remote from the screen 3 that a call is being received. Moreover, if an outgoing call, placed on an extension, is in progress, the line monitor 23 signals the CPU 13, which instructs the display driver 42 to turn the display screen blue. This gives a visual indication that the line is in use.

I claim:

1. An automated telephone directory for use in combination with a telephone and an incoming call number identification signal decoder including first database means containing the telephone directory information for a given geographical region sorted into a plurality of records, each record including a name field and a telephone number field; second database means for storing the telephone directory information of the source of incoming telephone calls sorted into records each record including name, telephone number, date, start time and duration fields; third database means for storing a personal telephone directory having information regarding selected individuals sorted into records, each record including a name field and a telephone number field; first input means for manually entering alphanumeric information into said third database means; second input means for selecting a record from said first or second database means; first processing means for copying the selected record from said first or second database means to said third database means; second processing means for searching said first and third database means for the record containing a telephone number of the source of an incoming telephone call provided by the incoming call number identification signal decoder and for copying the record from said first or third database means into said second database means; fourth database means for storing the directory information of the destination of outgoing telephone calls sorted into records, each record including name, telephone number, date, start time and duration fields; third processing means for searching said first and third database means for a record containing the telephone number of the destination of an outgoing call and, if found, for copying the record from said first or third database means to said fourth database means; clock means for providing the present date and time; fourth processing means for calculating the duration of incoming and outgoing calls and for storing the date, time and duration of incoming and outgoing calls in said second and fourth database means, respectively; page receiver means for receiving page messages; fifth processing means for copying the page messages from said page receiver means to said second database means along with the date and time of the page call and an indication that the call was a page; fifth database means for storing pager directory information sorted into a plurality of records, each record including a name field and a pager number field; sixth database means for storing a plurality of records, each comprising an alphanumeric message; paging means for initiating a page whereby the pager number and the alphanumeric message are selected from said fifty and sixth database, respectively, using said second input means; sixth processing means for copying page messages and the directory information of the destination of outgoing pages selected from said sixth and fifth database means, respectively, along with the date and time of the page call and an indication that the call was a page, to said fourth database means whenever said paging means is activated; seventh database means comprising the records from said second and fourth database means; call initiating means for dialling a number on the telephone, wherein the number to be dialled is selected from said first, second, third, fourth or seventh database means using said selector means and said second input means; display means for displaying the telephone directory information of the source of an incoming telephone call or for displaying a plurality of records from one of said database means, said plurality of records defining a page; selector means for selecting which of said database means to display on said display means; database indicator means for producing a distinct color pattern on the background of said display means for each of said database means; wherein when said fourth or seventh database means are displayed on said display means the backgrounds surrounding records of incoming calls have a distinct color pattern and the backgrounds surrounding records of outgoing calls have distinct color patterns indicative of the said database means from which the telephone calls were placed.

2. An automated telephone directory system according to claim 1 including page check means for sending a copy of each of the page messages sent by said paging means to said page receiver means.

3. An automated telephone directory system according to claim 1 including call indicator means for producing a distinct color pattern on the background of said display means when an incoming call is received and when an outgoing call is placed for indicating whether the phone is in use and whether the call is an incoming or outgoing call.

4. An automated telephone directory system according to claim 1, wherein said second input means includes page browsing means for selecting a page from one of said database means to be displayed on said display means; and pointer means for indicating on said display means a specific record from the selected page.

5. An automated telephone directory system according to claim 1, wherein said page browsing means changes the page displayed on said display means from a first page from one of said database means to a second page of said same database means and including third input means for selecting the number of pages between the first page and the second page and fourth input means for selecting whether the second page is prior or subsequent to the first page and for initiating the change.

6. An automated telephone directory system according to claim 5, wherein, if said fourth input means is actuated without activating said third input means, said page browser means displays the next page or the previous page.

7. An automated telephone directory system according to claim 6 including sound simulator means for simulating the sound of a book page turning whenever said page browser means is actuated.

8. An automated telephone directory system according to claim 1, wherein said first database means includes the telephone directory information of a metropolitan area, the records stored alphabetically by name and by business type, and in numerical order by telephone number.

9. An automated telephone directory system according to claim 1 including call redial means for automatically redialling a selected telephone number whereby, if the selected telephone line is busy said call redial means will disconnect the call and redial the selected telephone number until the call is completed or the caller disengages said call redial means.

10. An automated telephone directory system according to claim 1 including text coding means for automatically converting text messages into representative dual tone multi-frequency signals for transmission to a decoder at a remote paging system.

11. An automated telephone directory system according to claim 1, wherein the records of said first, second, third and fourth database means include a business field for indicating a caller's type of business.

* * * * *